June 13, 1961 R. C. BUTZOW 2,988,317
SCOOP HOLDER
Filed May 13, 1960
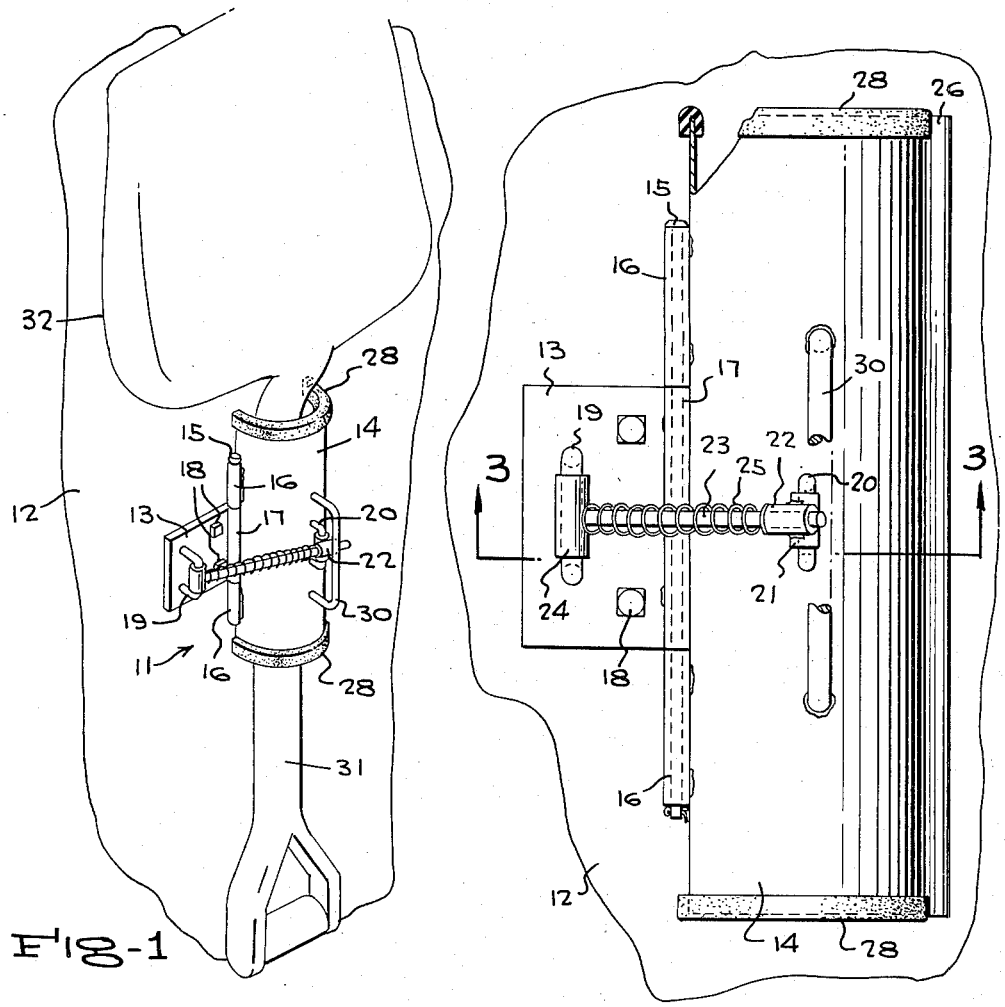
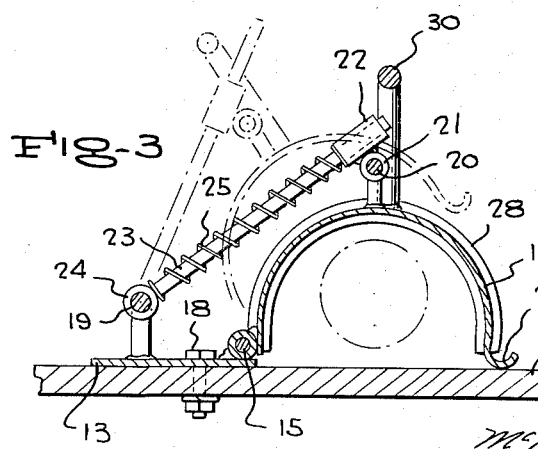
INVENTOR.
ROSS C. BUTZOW
BY
McMorrow, Berman & Davidson
ATTORNEYS

United States Patent Office 2,988,317
Patented June 13, 1961

2,988,317
SCOOP HOLDER
Ross C. Butzow, R.F.D. #2, Box 174, Milford, Ill.
Filed May 13, 1960, Ser. No. 28,887
3 Claims. (Cl. 248—309)

This invention relates to retaining bracket devices, and more particularly to a retaining bracket for holding a scoop or shovel in place on the side of a truck or similar vehicle.

A main object of the invention is to provide a novel and improved scoop holder for use in securing a shovel or scoop to the side of a truck or similar vehicle, or to any other substantially vertical supporting surface, the scoop holder being simple in construction, being easy to install, and providing a reliable means for securing a scoop or shovel in place while it is not in use and so that it is readily available for use whenever required.

A further object of the invention is to provide an improved scoop or shovel holder which is relatively inexpensive to fabricate, which is durable in construction, and which effectively secures a scoop or shovel to the side of a vehicle such as a truck, or the like, preventing loss of the scoop or shovel because of vibration of the vehicle during its movement, and being easy to operate for removing the scoop or shovel whenever its use is required.

Further objects and advantages of the invention will become apparent from the following description and claims, and from the accompanying drawings, wherein:

FIGURE 1 is a perspective view of an improved scoop holder according to the present invention shown in use.

FIGURE 2 is an enlarged elevational view, partly in cross section, of the scoop holder illustrated in FIGURE 1, and FIGURE 3 is a horizontal cross sectional view taken substantially on the line 3—3 of FIGURE 2.

Referring to the drawings, 11 generally designates a scoop holder assembly according to the present invention, the assembly being adapted to be secured to the side wall 12 of a truck, or similar vehicle. The assembly 11 comprises a main supporting plate 13 which is adapted to be vertically secured to the side wall 12 in the manner illustrated in FIGURE 1. Designated at 14 is a generally semicylindrical channel member which is hinged to one side vertical margin of the plate 13 for swinging movement on a vertical axis defined by a hinge pin 15 which is engaged through a pair of vertically aligned tubular hinge loops 16, 16 secured to a side margin of the channel member 14 and through an intervening hinge loop 17 secured to the side margin of the plate member 13 and disposed inbetween and in axial alignment with the loops 16, 16. Thus, the channel member 14 is supported for swinging movement toward and away from the wall 12 to which the device is attached.

The plate member 13 is suitably apertured so that a pair of fastening bolts 18, 18 may be engaged therethrough and through the wall 12 to fasten plate member 13 to said wall.

Rigidly secured to the plate member 13 and projecting outwardly therefrom is a generally U-shaped loop member 19 which is located a substantial distance horizontally from the hinge loop 17 and which is arranged substantially parallel thereto. A similar generally U-shaped loop member 20 is rigidly secured to the intermediate portion of the channel member 14 and projects outwardly therefrom.

Rotatably mounted on the bight portion of the loop member 20 is a pivot sleeve 21 and rigidly secured perpendicularly thereto is a guide sleeve 22. Designated at 23 is a link rod which is provided at one end with a transversely extending pivot sleeve 24 which is rotatably mounted on the bight portion of the loop member 19. The opposite end portion of the link rod 23 is slidably received in the sleeve 22. A coiled spring 25 surrounds the link rod 23, bearing between the sleeve member 24 and the sleeve member 22, biasing the sleeve member 22 outwardly and thus transmitting a biasing force through the lop member 20 to the chanel member 14, whereby the channel member is biased against the surface of the supporting wall 12, being biased in a clockwise direction, as viewed in FIGURE 3. Thus, the spring 25 acts to bias the channel member away from the plate, whereby the channel member is urged to rotate around the hinge pin 15 and to engage the supporting wall 12 at its free vertical edge. The free vertical edge of the channel member 14 is curved to define a rounded lip 26, so that it presents a rounded surface which allows a scoop member handle to slip freely therepast when the scoop member is removed from the supporting device 11. The top and bottom semicircular edges of the channel member 14 are further provided with protective means comprising rubber channel strips 28, 28 which prevent the top and bottom edges of the channel member 14 from marring the scoop handle.

Designated at 30 is a vertical generally U-shaped handle loop which is rigidly secured to the intermediate portion of the channel member 14, projecting outwardly therefrom and being of substantial size so that it may be readily grasped whenever it is desired to swing the channel member 14 outwardly away from the supporting wall 12.

In using the device, the channel member 14 is pulled outwardly by means of the handle 30 to allow the handle 31 of a scoop or shovel 32 to be received adjacent the wall 12 in the manner illustrated in FIGURE 1. When the channel member 14 is released, it engages around the scoop handle 31, the scoop being positioned in the manner illustrated in FIGURE 1, whereby the channel member 14 acts to support the scoop and to retain same against the wall 12 of the truck or other vehicle on which the device is mounted. The spring 25 acts to retain the channel member 14 with its rounded edge 26 in abutting engagement with the wall 12 of the truck, and thus supports the scoop handle 31 so that the scoop cannot accidentally become detached from the bracket device 11. However, when it is desired to remove the scoop for use, the operator merely grasps the handle 30 and exerts an outward force thereon, causing the channel member 14 to swing away from the wall 12, thus freeing the scoop handle 31 so that the scoop may be removed.

It will be noted that the sleeve member 22 and its pivot sleeve 21 provide a pivotal connection to the channel member 14 which allows the channel member 14 to swing freely around the hinge pin 15 while at the same time providing a bearing for the spring 25 so that the channel member 14 is constantly urged in a clockwise direction around the hinge pin 15 as viewed in FIGURE 3, and whereby its rounded edge 26 is constantly urged into abutment with the wall 12 of the vehicle.

While a specific embodiment of an improved scoop holder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A scoop holder comprising a main supporting plate, a channel member hinged to one margin of said plate, link means connected to said plate, means pivoted to the channel member and slidably receiving said link means, and spring means bearing between said link means and said last-named means and biasing the channel member outwardly from the plate.

2. A scoop holder comprising a main supporting plate, a channel member hinged to one margin of said plate, an outwardly projecting abutment member on said plate, link means connected to said abutment member, means pivoted to the channel member and slidably receiving said link means, and spring means bearing between said link means and said last-named means and biasing the channel member outwardly away from the plate.

3. A scoop holder comprising a main supporting plate, a channel member hinged to one margin of said plate, a generally U-shaped loop member rigidly secured to and projecting outwardly from said plate, a generally U-shaped outwardly projecting loop member rigidly secured on said channel member, a sleeve pivotally mounted on said second-named loop member, a link rod pivoted to said first-named loop member and slidably engaged in said sleeve, and a coiled spring surrounding said link rod and bearing on the sleeve to bias the channel member away from the plate.

References Cited in the file of this patent
UNITED STATES PATENTS 2,316,995    Smith  ------------------ Apr. 20, 1943